(12) United States Patent
Lin

(10) Patent No.: US 8,655,554 B2
(45) Date of Patent: Feb. 18, 2014

(54) AUTONOMOUS SEAT SYSTEM OF AUTOMOTIVE VEHICLE AND PERFORMING METHOD THEREOF

(75) Inventor: Chyi-yeu Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 218 days.

(21) Appl. No.: 13/343,702

(22) Filed: Jan. 4, 2012

(65) Prior Publication Data

US 2013/0006478 A1    Jan. 3, 2013

(30) Foreign Application Priority Data

Jun. 29, 2011    (TW) .............................. 100122889 A

(51) Int. Cl.
*B60N 2/04*    (2006.01)
(52) U.S. Cl.
USPC ................ 701/49; 701/36; 297/1; 296/65.01; 296/65.06; 296/65.12
(58) Field of Classification Search
None
See application file for complete search history.

(56) References Cited

U.S. PATENT DOCUMENTS

| | | | | |
|---|---|---|---|---|
| 5,321,617 A | * | 6/1994 | Mori et al. | 701/49 |
| 7,822,523 B2 | * | 10/2010 | Yoshida et al. | 701/49 |
| 8,126,616 B2 | * | 2/2012 | Phipps et al. | 701/49 |
| 2003/0052793 A1 | * | 3/2003 | Gustason et al. | 340/693.9 |
| 2005/0167546 A1 | * | 8/2005 | Jones et al. | 244/118.5 |
| 2006/0131093 A1 | * | 6/2006 | Egami | 180/272 |
| 2007/0276568 A1 | * | 11/2007 | Tozu | 701/49 |
| 2009/0164073 A1 | * | 6/2009 | Mabuchi et al. | 701/49 |
| 2009/0179987 A1 | * | 7/2009 | Kim | 348/142 |
| 2010/0066116 A1 | * | 3/2010 | Coenen | 296/65.01 |
| 2010/0191426 A1 | * | 7/2010 | Miyajima et al. | 701/49 |
| 2010/0274438 A1 | | 10/2010 | Egami | |
| 2011/0320092 A1 | * | 12/2011 | Knighton et al. | 701/49 |

FOREIGN PATENT DOCUMENTS

DE    10349857 A1    5/2004
JP    2006155000 A    6/2006

* cited by examiner

*Primary Examiner* — Jonathan M Dager

(57) ABSTRACT

An autonomous seat system of an automotive vehicle and a performing method thereof are disclosed. The system and method are aimed to reduce discomfort of a passenger due to centrifugal forces resulted from vehicle's turning motion. The system includes a lane prediction unit, a control unit, and a seat adjusting unit. The lane prediction unit is utilized for obtaining lane information in front of the automotive vehicle. According to the lane information the control unit calculates the centrifugal force which the passenger experiences while sitting in a seat of the automotive vehicle, and a seat tilt angle which is required for the seat to compensate the centrifugal force after a predetermined time interval. The seat adjusting unit adjusts the seat to the seat tilt angle after the predetermined time interval so as to reduce or eliminate the ill-effect on the passenger resulted from the centrifugal force.

10 Claims, 2 Drawing Sheets

AUTONOMOUS SEAT SYSTEM OF AUTOMOTIVE VEHICLE AND PERFORMING METHOD THEREOF

TECHNICAL FIELD OF THE INVENTION

The present invention relates to a seat system, especially to an automotive vehicle autonomous seat system and a performing method thereof.

BACKGROUND OF THE INVENTION

When motorists are going around a curve, centrifugal forces arising from deceleration, turning, acceleration and other factors make passengers top-heavy, and make the passenger be thrown forwards, outwards, and/or backwards to shake their bodies leading to sensory and visual differences, causing carsickness to a passenger.

Traditional ways to prevent the passengers from feeling carsick include to look out of the window, to open the window, to take carsickness pills before getting into a vehicle, to sleep, to imagine himself is the driver and so on. In abovementioned ways, taking carsickness pills in advance is a more effective method to overcome carsickness as compared to the other methods. However, the carsickness pills must be prepared firstly, hence it is a burden.

To date, humans lack effective prevention and restraint methods with respect to the carsickness, and the pain caused by the carsickness makes people fear a long-distance driving or a long-distance vehicle travels. Therefore, it is still a lack of the effective prevention and restraint methods with respect to the carsickness at present, and a solution is still needed.

SUMMARY OF THE INVENTION

An objective of the present invention is to provide an autonomous seat system of an automotive vehicle and a performing method thereof, which are capable of adjusting a seat tilt angle and making a center of gravity of a passenger shift for reducing or completely offsetting a centrifugal force applied to the passenger while the vehicle makes a turn.

The automotive vehicle autonomous seat system according to the present invention includes a lane prediction unit, a control unit, and a seat adjusting unit. The lane prediction unit is used for obtaining a lane information in front of an automotive vehicle. The control unit is electrically coupled to the lane prediction unit, and the control unit calculates a centrifugal force applied to a passenger in a seat of the automotive vehicle after a predetermined time interval according to the lane information and calculates the seat tilt angle adjustment required for reducing or completely offsetting the centrifugal force applied to the passenger after the predetermined time interval. The seat adjusting unit is electrically coupled to the control unit for adjusting the seat to tilt to the seat tilt angle after the predetermined time interval.

The present invention also provides a performing method of the automotive vehicle autonomous seat system in accordance with the present invention. The automotive vehicle autonomous seat system includes a lane prediction unit, a control unit electrically coupled to the lane prediction unit, and a seat adjusting unit electrically coupled to the control unit. The performing method comprises: to obtain a lane information in front of an automotive vehicle in the lane prediction unit; to calculate a centrifugal force applied to a passenger in a seat of the automotive vehicle after a predetermined time interval according to the lane information and to calculate a seat tilt angle for reducing or completely offsetting the centrifugal force applied to the passenger after the predetermined time interval in the control unit; and to adjust the seat to tilt to the seat tilt angle after the predetermined time interval by the seat adjusting unit.

The automotive vehicle autonomous seat system and the performing method make the passenger feel the centrifugal force being reduced or removed without the carsickness occurred by means of predicting the centrifugal force applied to the passenger in the seat after the predetermined time interval and calculating the seat tilt angle that is utilized to overcoming the centrifugal force after the predetermined time interval.

DETAILED DESCRIPTION OF THE INVENTION

Reference will now be made in detail to the present preferred embodiment of the invention, example of which is illustrated in the accompanying drawings.

Figure 1:
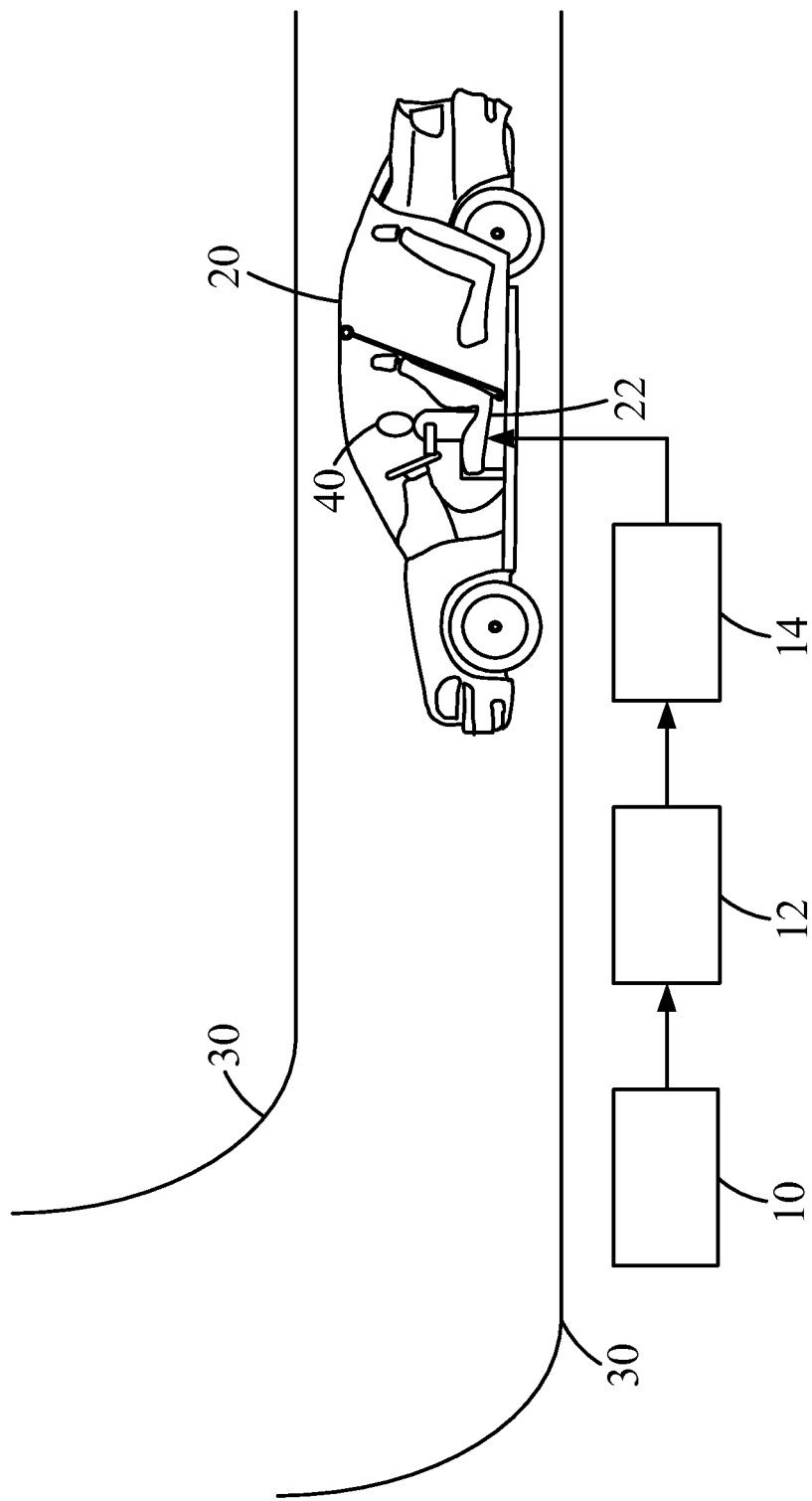
FIG. 1 depicts a schematic drawing illustrating an automotive vehicle autonomous seat system according to a first embodiment of the present invention.

Referring to FIG. 1, FIG. 1 depicts a schematic drawing illustrating an automotive vehicle autonomous seat system according to a first embodiment of the present invention. The automotive vehicle autonomous seat system includes a lane prediction unit 10, a control unit 12, and a seat adjusting unit 14. The lane prediction unit 10 is used for obtaining a lane information in front of an automotive vehicle 20. The control unit 12 is electrically coupled to the lane prediction unit 10, and the control unit calculates a centrifugal force applied to a passenger 40 on a seat 22 after a predetermined time interval such as 1 second according to the lane information and calculates the seat tilt angle for reducing or completely offsetting the centrifugal force applied to the passenger 40 after 1 second. The seat adjusting unit 14 is electrically coupled to the control unit 12 for adjusting the seat 22 to tilt to the seat tilt angle after 1 second for reducing or completely offsetting the centrifugal force. It should be noted that the seat 22 is a passenger seat located at the right of the driver's seat in the embodiment. In other embodiment, it can be any seat within the automotive vehicle 20.

The lane information obtained by the lane prediction unit 10 includes a lane boundary 30 that is served as a basis for calculating a lane curvature in front of the automotive vehicle. In one embodiment, the lane prediction unit 10 includes at least one camera (not shown), which can be disposed at a position that can record the front lane boundary 30 on the automotive vehicle 20, such as a top of a license plate. The at least one camera can immediately record images in the front of the automotive vehicle, and the lane boundary 30 in the front of the automotive vehicle 20 is determined through the recorded images and is sent to the control unit 12. In another embodiment, the lane prediction unit 10 includes a Global Positioning System (GPS) (not shown), and the lane prediction unit 10 calculates the lane boundary 30 passed by the automotive vehicle 20 through a map provided from the GPS and sends the lane boundary 30 to the control unit 12.

It should be explained that an objects with a mass m turns in a road with a radius R of curvature at a tangential speed V, and an centrifugal force F applying to the mass m equals to $mV^2/R$. Thus, while the automotive vehicle 20 is faster (i.e., V is larger) or the road is more sharply curved (i.e., R is smaller), the centrifugal force applied to the passenger 40 is greater.

After receiving the lane information including the lane boundary 30 provided by the lane prediction unit 10, the control unit 12 calculates the lane curvature after 1 second according to the lane information and then calculates predictable size and direction of the centrifugal force applied to the passenger 40 in the seat 22 after 1 second. The centrifugal force, which is applied to the passenger 40 in the seat 22 after 1 second, is proportional to the lane curvature after 1 second and the current vehicle speed, that is to say, the smaller lane curvature radius indicates the larger centrifugal force, also the larger current vehicle speed indicates the larger centrifugal force. At the time the passenger 40 in the seat 22 is about to feel the centrifugal force, the seat adjusting unit 14 tilts the seat 22 moderately so as to shift the center of gravity of the passenger 40 from a vertical line at a center of the seat 22. The shifted center of gravity enables a center of gravity of an upper body of the passenger 40 to generate a centripetal force which will reduce or completely offset the centrifugal force caused from the turning of the automotive vehicle 20.

Different upper body heights have various contact areas between a seatback of the seat 22 and the upper body, so there are various frictional forces occurred. Furthermore, the centrifugal force applied to the passenger 40 in the seat 22 will be slightly changed, which makes the desired seat tilt angle slight different. The seat tilt angle is proportional to the centrifugal force and the upper body height of the passenger 40 in the seat 22. That is to say, when the upper body of the passenger 40 in the seat 22 is higher, a percentage of a relative area contacting to the seatback decreases, and a percentage of the frictional force between the seatback and the upper body relative to the weight of the upper body also decreases. Under this condition, the centrifugal force applied to the upper body of the passenger 40 is larger, and the seat tilt angle required for compensating the centrifugal force is larger. In order to simplify the system's complexity and reduce the process as either to actively detect or to manually enter the upper body height, the passenger 40 can be assumed as an adult, and the upper body height thereof is a fixed value to simplify the calculating processes of the centrifugal force and the seat tilt angle. After calculating the desired seat tilt angle, the control unit 12 dispatches the information of the seat tilt angle to the seat adjusting unit 14, so that the seat adjusting unit 14 adjusts the seat 22 to tilt to the seat tilt angle after 1 second. Accordingly, the centrifugal force applied to the passenger 40 after 1 second can be reduced or completely offset, so that a feeling which the upper body of the passenger 40 is swung by the centrifugal force at a corner can be reduced or even eliminated, thereby reducing or eliminating a key factor of the carsickness.

In the embodiment, the control unit calculates the centrifugal force applied to the passenger 40 in the seat 22 after 1 second according to a lane curvature the vehicle will reach after 1 second based on the current vehicle speed. However, it can be seen from statistical data that most drivers throttle down before going round a corner, hence the centrifugal force after 1 second can be more accurately calculated if an effect of the slowdown within the period of time of 1 second is taken into account.

In order to take into account the slowdown, in another embodiment, the control unit calculates the centrifugal force applied to the passenger 40 in the seat 22 after 1 second according to the lane curvature after 1 second and the vehicle speed after 1 second. The centrifugal force applied to the passenger 40 in the seat 22 after 1 second is proportional to the lane curvature after 1 second and the square of the predicted vehicle speed after 1 second.

In yet another embodiment, the vehicle speed after 1 second can be further calculated according to a real-time brake information, and then the centrifugal force applied to the passenger 40 in the seat 22 after 1 second can be calculated. Under this condition, the centrifugal force applied to the passenger 40 in the seat 22 after 1 second relates to the lane curvature after 1 second and the predicted vehicle speed after 1 second according to the current vehicle speed and the real-time brake information. Said brake information refers to ranges and speeds jamming on the brake pedal, which can be utilized to estimate the change of the vehicle speed and to revise the predicted vehicle speed.

Said predicted vehicle speed after 1 second indicates a speed after the automotive vehicle 20 slows down when the drivers go round a corner. The speed can be acquired through the statistics of most slowdown behavior for a basis. For example, assuming that the current vehicle speed is 60 km per hour and there is a corner with a certain radius of curvature 20 meters in front of the automotive vehicle 20 in the lane, the most drivers will decrease the vehicle speed for 10 km per hour after 1 second through the statistics, so the predicted vehicle speed is 50 km per hour after 1 second. Moreover, the real-time brake information can be provided from the brakes (not shown) of the automotive vehicle 20, so that the actual brake situation of the automotive vehicle 20 is able to be represented via the real-time brake information, and the predicted vehicle speed after 1 second can be calculated more accurately.

Subsequently, the control unit 12 calculates the desired seat tilt angle for offsetting the centrifugal force after 1 second according to the calculated centrifugal force and the upper body height of the passenger 40. The seat tilt angle is proportional to the centrifugal force and the upper body height of the passenger 40 in the seat 22. Finally, the control unit 12 dispatches the information of the seat tilt angle to the seat adjusting unit 14, so that the seat adjusting unit 14 adjusts the seat 22 to tilt to the seat tilt angle after 1 second, thereby offsetting the centrifugal force of the passenger 40 in the seat 22 after 1 second. In actual operation, the centrifugal force also can be reduced but not fully offset due to control convenience and simplicity of the seat adjusting unit 14. The control unit 12 dispatches an appropriately amended tilt angle information of the seat to the seat adjusting unit 14, so that the seat adjusting unit 14 can adjust the seat 22 to the appropriately amended tilt angle of the seat, thereby decreasing the centrifugal force of the passenger 40 in the seat 22 after 1 second.

It should be noted that the predetermined time interval is not limited to 1 second and it can be adjusted according to actual needs. For example, the adjustment refers the required time that the lane prediction unit 10 calculates the lane curvature, and the seat adjusting unit 14 controls the seat 22 to tilt to the predetermined tilt angle, and so on.

Figure 2:
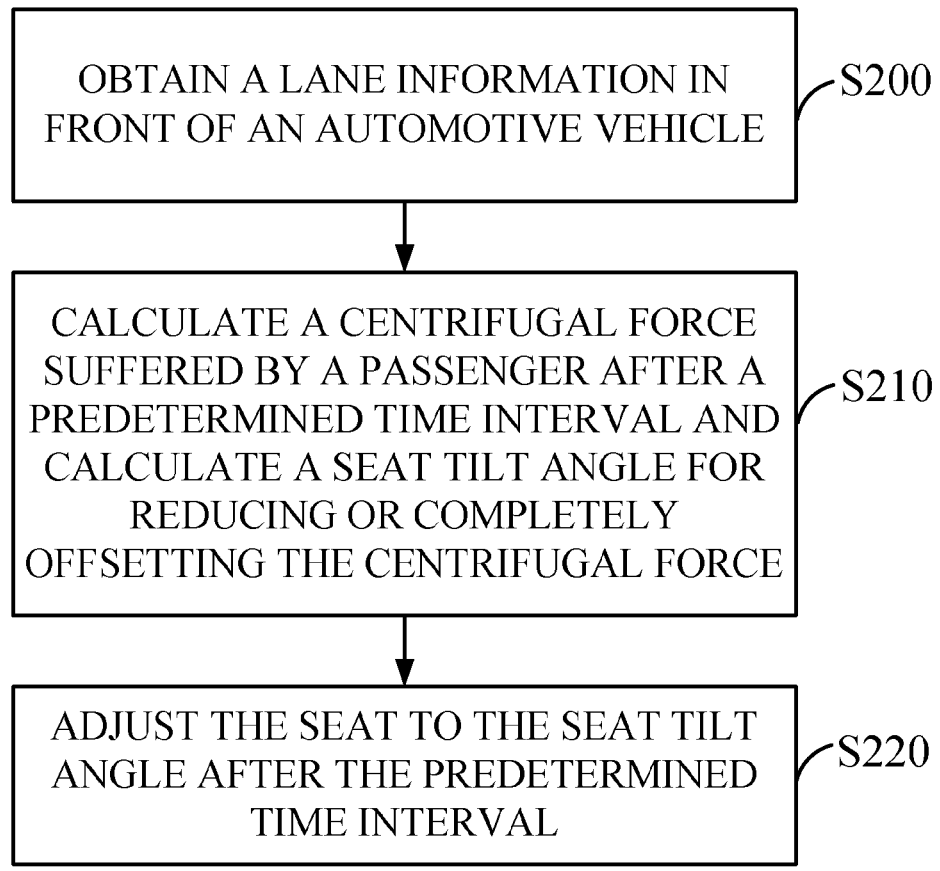
FIG. 2 depicts a flow chart illustrating a performing method of an automotive vehicle autonomous seat system according to the present invention.

Referring to FIG. 2, FIG. 2 depicts a flow chart illustrating a performing method of an automotive vehicle autonomous seat system according to the present invention. The autonomous seat system includes a lane prediction unit, a control unit electrically coupled to the lane prediction unit, and a seat adjusting unit electrically coupled to the control unit. The performing method includes the following steps.

At step S200, the lane prediction unit 10 obtains the lane information in front of the automotive vehicle, where the lane information includes the lane information in front of the automotive vehicle or a lane boundary that is served as a basis for calculating a lane curvature.

At step S210, the control unit calculates a centrifugal force applied to a passenger in a seat of the automotive vehicle after a predetermined time interval according to the lane information and calculates a seat tilt angle for reducing or completely offsetting the centrifugal force applied to the passenger after the predetermined time interval.

In one embodiment, the control unit calculates the centrifugal force applied to the passenger in the seat after the predetermined time interval according to a lane curvature after the predetermined time interval and a current speed. The centrifugal force of the seat after the predetermined time interval is proportional to the lane curvature after the predetermined time interval and the current vehicle speed.

In order to take into account the slowdown for turning a corner, in another embodiment, the control unit calculates the centrifugal force applied to the passenger in the seat after the predetermined time interval according to a lane curvature, after the predetermined time interval and a predicted speed after the predetermined time interval. After the predetermined time interval, the centrifugal force applied to the passenger in the seat after 1 second is proportional to the lane curvature and the square of the predicted vehicle speed after the predetermined time interval.

In yet another embodiment, the vehicle speed after the predetermined time interval can be further calculated according to a real-time brake information, and then the centrifugal force applied to the passenger in the seat can be calculated. Therefore, after the predetermined time interval, the centrifugal force applied to the passenger 40 in the seat 22 relates to the lane curvature after the predetermined time interval and the predicted vehicle speed after the predetermined time interval according to the current vehicle speed and the real-time brake information. Said brake information refers to ranges and speeds jamming on the brake pedal, which can be utilized to estimate the change of the vehicle speed and to revise the predicted vehicle speed.

After calculating the centrifugal force applied to the passenger in the seat, the control unit calculates the seat tilt angle according to the centrifugal force and the upper body height of the passenger in the seat. The seat tilt angle is proportional to the centrifugal force and the upper body height of the passenger in the seat.

At step S220, the seat adjusting unit adjusts the seat to tilt to the seat tilt angle after the predetermined time interval for reducing or completely offsetting the centrifugal force, so that a feeling which the upper body of the passenger 40 is swung by the centrifugal force at a corner can be reduced or even eliminated, thereby reducing or eliminating a key factor of the carsickness.

In summary, the automotive vehicle autonomous seat system and the performing method of the present invention predict the centrifugal force applied to the passenger in the seat after the predetermined time interval and calculate the seat tilt angle that is utilized to overcoming the centrifugal force applied to the passengers after the predetermined time interval. In other words, the seat is not adjusted after the centrifugal force has been applied to the passengers in the present invention. The seat is adjusted to the seat tilt angle for reducing or completely offsetting the centrifugal force at the moment of the centrifugal force occurred. There is no significant time difference between the two for effective elimination of the carsickness phenomena.

While the preferred embodiments of the present invention has been illustrated and described in detail, various modifications and alterations can be made by persons skilled in this method. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An autonomous seat system of an automotive vehicle, comprising:
    a lane prediction unit for obtaining a lane information in front of an automotive vehicle;
    a control unit electrically coupled to the lane prediction unit, the control unit calculating an inertial force due to circular motion applied to a passenger in a seat of the automotive vehicle after a predetermined time interval according to the lane information and calculating a seat tilt angle for reducing or completely offsetting said inertial force due to circular motion applied to the passenger after the predetermined time interval; and
    a seat adjusting unit electrically coupled to the control unit for adjusting the seat to tilt to the seat tilt angle after the predetermined time interval.

2. The system of claim 1, wherein the lane prediction unit comprises at least one camera.

3. The system of claim 1, wherein the lane prediction unit comprises a global positioning system.

4. The system of claim 1, wherein the control unit calculates the inertial force due to circular motion applied to the passenger in the seat after the predetermined time interval according to a lane curvature after the predetermined time interval and a current speed.

5. The system of claim 1, wherein the control unit calculates the inertial force due to circular motion applied to the passenger in the seat after the predetermined time interval according to a lane curvature after the predetermined time interval and a predicted speed after the predetermined time interval.

6. The system of claim 1, wherein the control unit calculates the inertial force due to circular motion applied to the passenger in the seat according to an upper body height of the passenger.

7. A performing method of an automotive vehicle autonomous seat system, the automotive vehicle autonomous seat system comprising a lane prediction unit, a control unit electrically coupled to the lane prediction unit, and a seat adjusting unit electrically coupled to the control unit, the performing method comprising:
    obtaining a lane information in front of an automotive vehicle by the lane prediction unit;
    calculating an inertial force due to circular motion applied to a passenger in a seat of the automotive vehicle after a predetermined time interval according to the lane information and calculating a seat tilt angle for reducing or completely offsetting the inertial force due to circular motion applied to the passenger after the predetermined time interval by the control unit; and
    adjusting the seat to tilt to the seat tilt angle after the predetermined time interval by the seat adjusting unit.

8. The performing method of claim 7, wherein said control unit calculates the inertial force due to circular motion applied to the passenger in the seat after the predetermined time interval according to a lane curvature after the predetermined time interval and a current speed.

9. The performing method of claim 7, wherein the control unit calculates the inertial force due to circular motion applied to the passenger in the seat after the predetermined time interval according to a lane curvature, after the predetermined time interval and a predicted speed after the predetermined time interval.

10. The performing method of claim 7, wherein the control unit calculates the inertial force due to circular motion applied to the passenger in the seat according to an upper body height of the passenger.

* * * * *